Aug. 30, 1927.  1,641,078
J. S. FURST
LEAD LAYING MACHINE FOR PENCILS
Filed Jan. 18, 1926   4 Sheets-Sheet 1
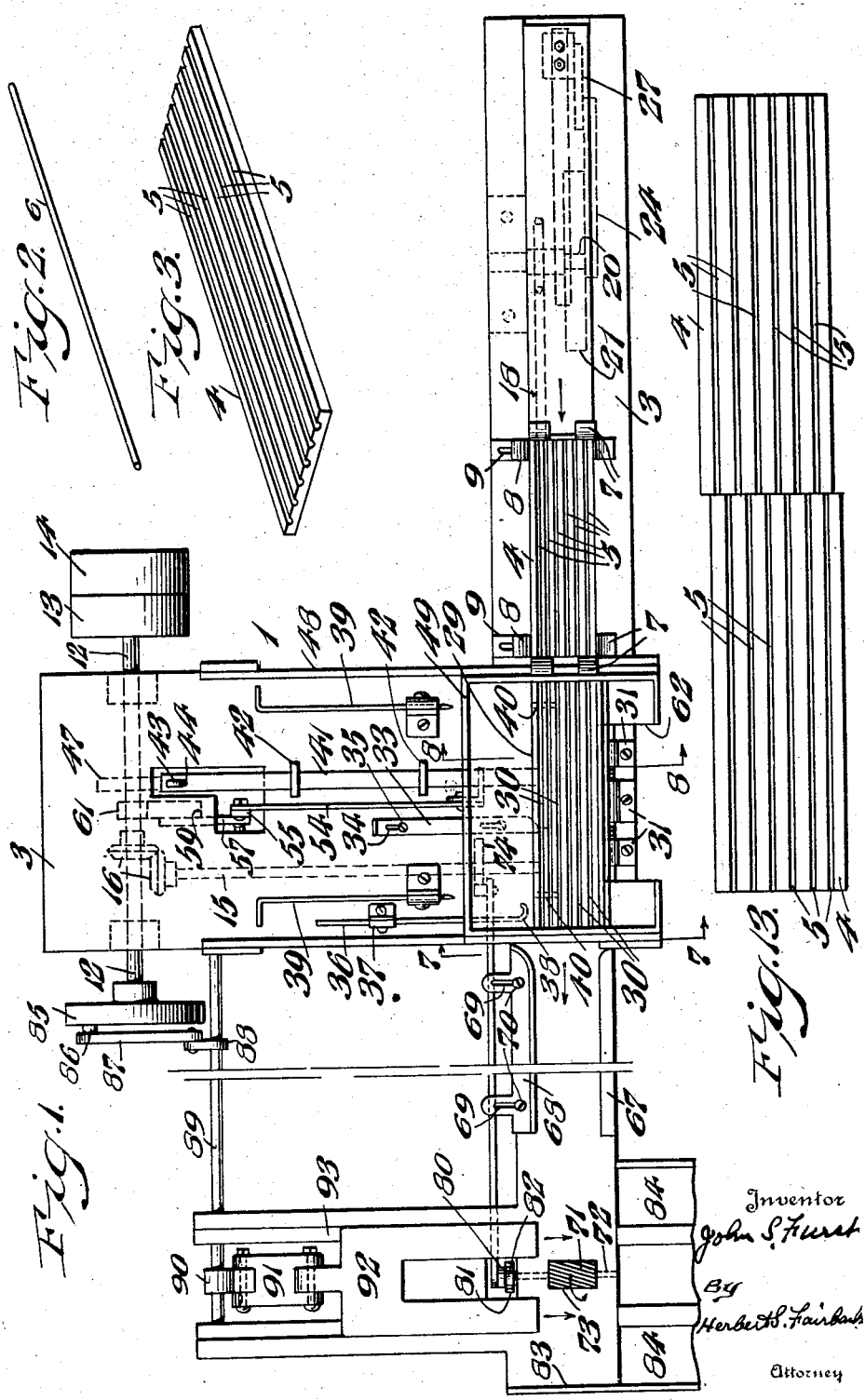
Inventor
John S. Furst
By
Herbert S. Fairbanks
Attorney

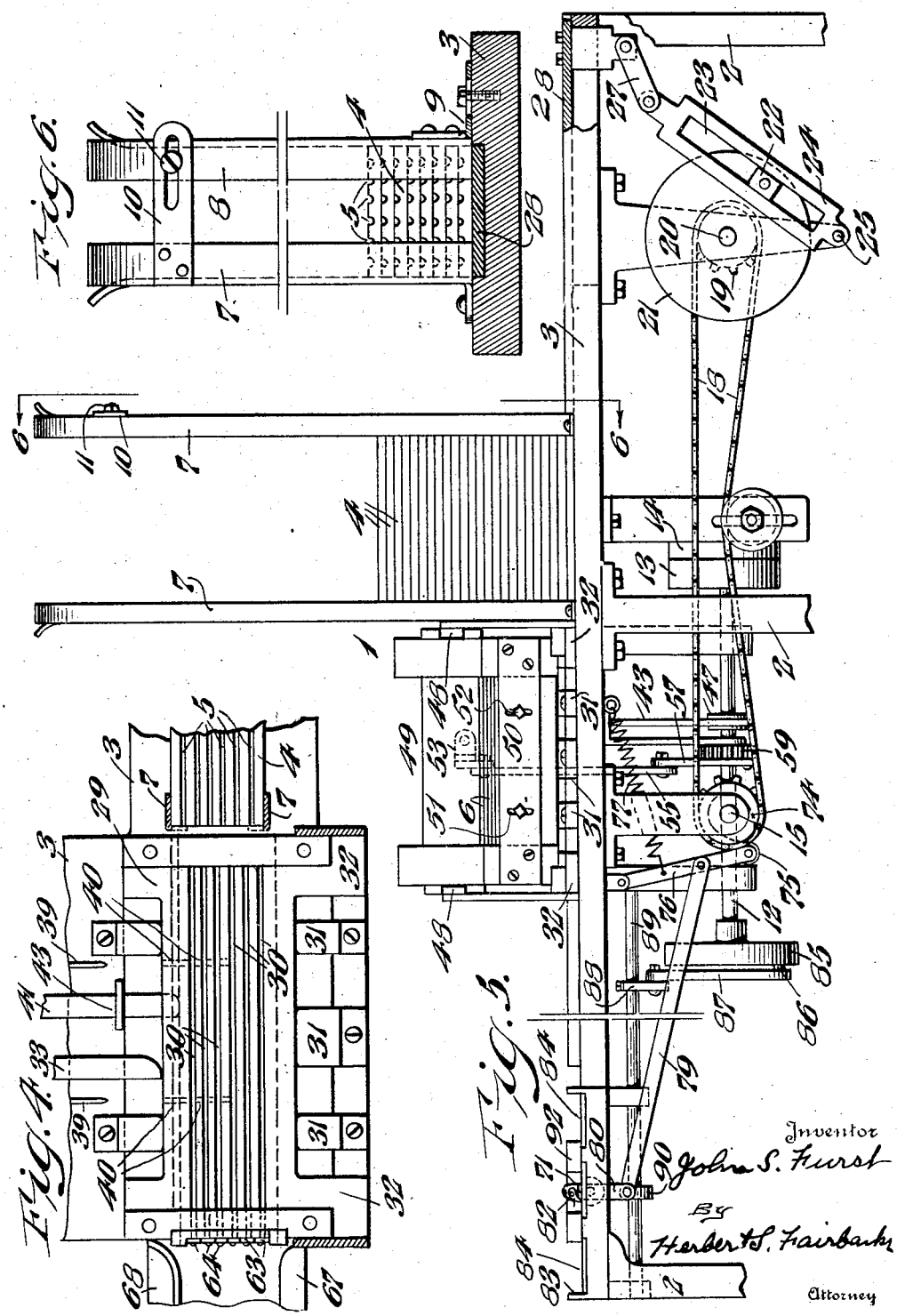

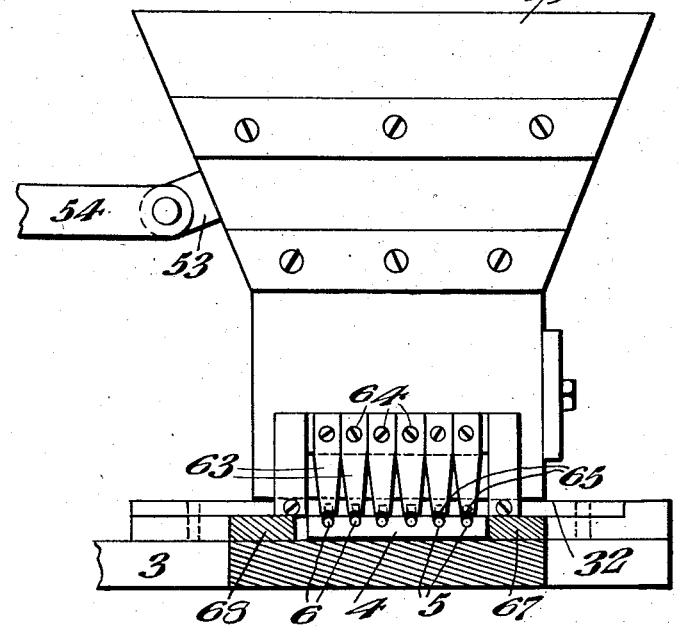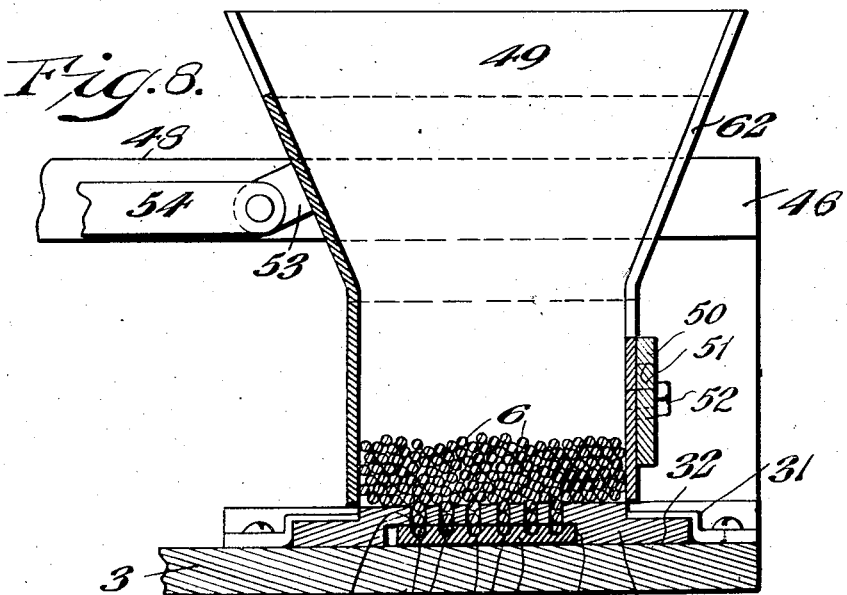

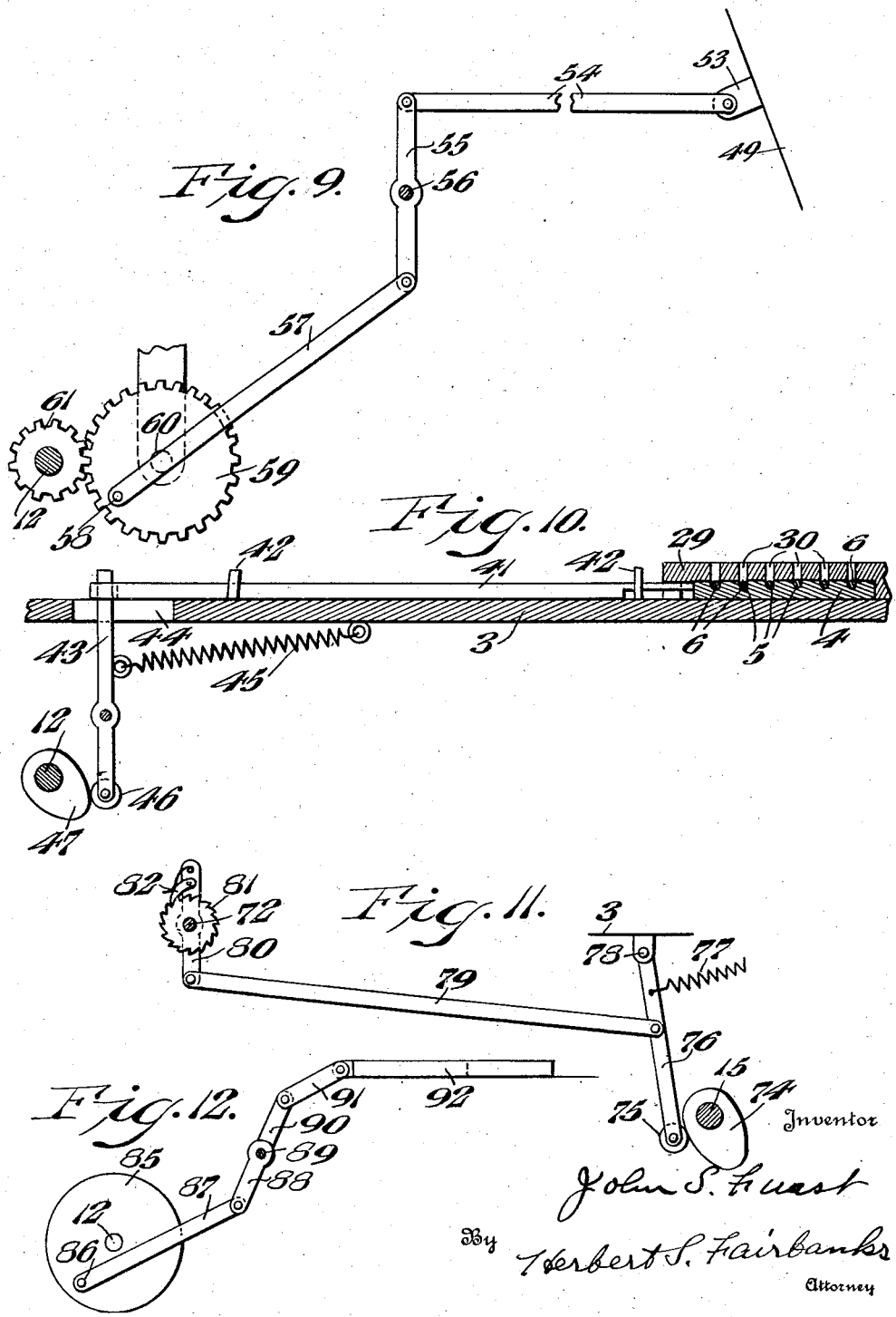

Patented Aug. 30, 1927.

1,641,078

UNITED STATES PATENT OFFICE.

JOHN S. FURST, OF PHILADELPHIA, PENNSYLVANIA.

LEAD-LAYING MACHINE FOR PENCILS.

Application filed January 18, 1926. Serial No. 82,096.

The object of this invention is to devise a novel lead laying machine for pencils whereby the leads will be automatically placed in the grooves of lead pencil slats.

This work of filling the grooves of the slats with lead has heretofore been done by manual labor, and, due to the fact that these leads are often bent or deformed, it has, in so far as I am aware, been deemed commercially impracticable to place the leads in the grooves of the pencil slats by the use of a machine.

A further object of my invention is to devise a novel machine wherein the grooved slats will be automatically fed into lead receiving position; wherein the leads are automatically placed in the grooves; and wherein the filled slats are then fed to a desired point of utilization.

With the above and other objects in view, as will hereinafter clearly appear, my invention comprehends a novel construction and arrangement of a lead laying machine for pencils.

It further comprehends a novel lead laying machine having novel means to progressively advance the grooved slats into filling position beneath a novel construction and arrangement of a grid, novel means for causing the leads in a hopper to pass into the slots of said grid, novel means for preventing more than one lead in a groove being discharged with a filled slat, novel means for effecting the alignment of the slats during the filling operation and for securing them in their filling position, and novel means for feeding the filled slats from the machine.

It further comprehends a novel construction of a grid having a series of parallel slots, and novel means for reciprocating a lead containing hopper above said grid.

Other novel features of construction and advantage will hereinafter more clearly appear in the detailed description and the appended claims.

For the purpose of illustrating my invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not, therefore, limited to the precise arrangement and organization of these instrumentalities as herein set forth.

Figure 1 is a top plan view of a lead laying machine embodying my invention.

Figure 2 is a perspective view of one of the leads.

Figure 3 is a perspective view of the pencil slat.

Figure 4 is a sectional view of a portion of the machine with the hopper removed.

Figure 5 is a front elevation of the machine.

Figure 6 is a section on line 6—6 of Figure 5.

Figure 7 is an end elevation of the hopper with the grid and bed in section.

Figure 8 is a sectional elevation of the hopper on line 8—8 of Figure 1 with the grid and bed in section.

Figure 9 is a detail of the connection for reciprocating the hopper.

Figure 10 is a section through the bed showing the slat aligning mechanism.

Figure 11 is a detail showing the connections for feeding pencil slats.

Figure 12 is a detail of connections for feeding the slats from the machine.

Figure 13 is a detail of two slats out of alignment with each other when a lead carrying slat is being moved from beneath the grid.

Similar numerals of reference indicate corresponding parts.

Referring to the drawings:—

1 designates a lead filling machine embodying my invention. The machine is provided with a suitable frame 2 which carries a table or bed 3. 4 designates a wooden slat having a desired number of longitudinally extending spaced grooves 5 which are adapted to receive the lead 6. These wooden slats 4 are stacked one above the other on the table 3, and are retained in aligned position by means of the angles 7 and 8 which at their lower ends are adjustably connected with the table by means of the slotted brackets 9, adjustably secured to the table.

The angles 7 carry the slotted arms 10 through which pass the fastening devices 11 carried by the angles 8 so that the angles can be relatively adjusted to receive slats of different dimensions. The main driving shaft 12 is suitably journalled in the frame 2, and I have shown a conventional type of fixed pulley 13 and loose pulley 14 so that the machine is adapted to be driven by any desired source of power.

The main driving shaft 12 is intergeared with an auxiliary shaft 15, as at 16, so that the shaft 15 is driven in unison with the shaft 12. The shaft 15 has fixed to it a sprocket wheel 17 around which passes a sprocket chain 18, the latter also passing around a sprocket wheel 19 carried by a shaft 20 suitably journalled in the machine frame.

This shaft 20 has fixed to it a disc 21 having eccentrically connected with it a shoe 22 which travels in the slot 23 of a link 24 which is pivoted at its lower end as at 25 to a fixed portion of the frame.

The opposite end of the link 24 is pivotally connected with a link 26 which latter is pivotally connected to a link 27. The link 27 is pivotally connected to a push bar 28, guided in the table, so that, on its forward or operative stroke, it will advance the lowermost slat from the stack of grooved slats beneath a grid 29 having a desired number of longitudinally extending spaced slots 30.

The grid 29 is fixed in its aligned position by means of the clamps 31 which are fixed to the table. The grid has at its bottom the spacers 32 which cause the slotted portion to be positioned above the table sufficiently to permit a grooved slat 4 to pass beneath the grid. The slats pass beneath the grid and at one side contact with one of the clamps 31 and at the opposite side by the guide member 33 having slots 34 through which pass fastening devices 35. The front end of the aligning guide 33 is rounded at one corner, and the member 33 is adjusted to bring its front end a desired distance from the shoulders 31. I also provide an aligning rod 36 adjustably mounted in the bracket 37, and its front end is bent as at 38 to form a guide for the slat beneath the grid.

I also provide rods 39 which are adjustably connected with the table and are adapted to pass through apertures 40 in the grid 29 to prevent the leads in a desired number of slots 30 passing therethrough. 41 designates an aligning member traveling in guides 42 and controlled by the lever 43 which passes through a slot 44 in the base member. A spring 45 tends to retain a roller 46 carried by the lever 43 in engagement with a cam 47 on the main driving shaft 12, so that, at the proper time, the aligning member 41 is moved forwardly and rearwardly.

The base 3 supports at opposite sides the guide bars 48 on which a hopper 49 is adapted to reciprocate. This hopper 49 carries the supply of leads 6 and is provided with an open bottom. At its front side, it is provided with a plate 50 carried by a bar 51 and secured thereto by screws 52 so that the height of the bottom of this plate above the grid can be varied as may be desired to compensate for wear on the plate or grid.

The hopper 49 has fixed to its rear wall an apertured lug 53, to which is pivoted one end of a link 54, the other end of which is pivotally connected with a lever 55 fulcrumed at 56 in the machine frame. A link 57 is pivotally connected with the lower end of the lever 55 and with the stud 58, eccentrically secured to the sides of a gear 59 on a shaft 60 journalled in the machine frame and meshing with a gear 61 on the main driving shaft 12, so that, at the proper times, the hopper will be moved forwardly and rearwardly.

In order to facilitate the filling of the hopper with the leads, the front face of the hopper is cut away as at 62. The front end of the grid has secured to it resilient stop members 63, by means of fastening devices 64. These stops are in the form of metal strips secured at their upper ends by their fastening devices to the wall of the grid, and their lower ends are provided with the notches 65 which are disposed above the grooves of a slat passing beneath, so that, when a filled slat is being fed from beneath the grid, only one lead can remain in a slot of a slat as such slat is being discharged.

The grid 29 is recessed as at 66, see Figure 8, to guide a slat passing from beneath the grid. A slat then passes between a stationary guide 67 and an adjustable guide 68, see Figures 1 and 4. The guide 68 is provided with slots 69 through which pass fastening devices 70 which secures the adjustable guide 68 in its adjusted position.

The portions of the guides 67 and 68 nearest the hopper are preferably rounded as shown in Figure 1. A lead containing slat passes from the guides 67 and 68 along the table 3 into contact with a feed roller 71 which is mounted on a shaft 72 journalled in the machine frame, and the table is slotted as at 73 so that the slat will contact with the roller. This feed roller is intermittently driven by means of a pawl and ratchet connection from the auxiliary shaft 15. The shaft 15, see more particularly Figure 11, has fixed to it a cam 74 which co-operates with a roller 77, the opposite end of said spring being connected to a fixed portion of the machine, so that the roller 75 is maintained in contact with the cam 74. The lever 76 is fulcrumed at 78 to a fixed portion of the machine, and a link 79 has one end connected with the lever 76 and its other end connected to a rock arm 80 loosely mounted on the shaft 72 to which latter is fixed a ratchet 81, with which co-operates a spring pressed pawl 82 carried by the rock arm 80.

It will thus be seen that, during the operation of the machine, the feed roller 71 is intermittently driven to progressively move a lead containing slat against an aligning member 83 formed by a wall of the conveyor table 84, which, in the present instance, extends at an angle from the table 3. In order to automatically effect the feeding of the lead containing slats along the conveyor table 84, I provide the following feed mechanism:—

The main driving shaft 12, see Figures 1 and 12, has fixed to it a disc 85, to which is eccentrically connected, as at 86, a link 87, which in turn is connected with a rock arm 88, fixed to a rock shaft 89, suitably journalled in the machine frame. The rock shaft 89 has connected with it an arm 90, to which is connected one end of a link 91, the opposite end of the link being connected to a push bar 92 which is slidable in guides 93, so that a slat in which the lead has been aligned will be automatically fed from the table 3 along the conveyor table 84.

The operation of my novel lead laying machine for pencils will now be clear to those skilled in this art and is as follows:

The grooved slats 4 are stacked between the guides 7 and 8 and a supply of leads 6 is placed in the hopper 49.

Assuming now that the main driving shaft 12 is revolving, it will be apparent that the auxiliary shaft 15 which is intergeared therewith, as at 16, is also revolving.

The sprocket chain 18, driven from the shaft 15, drives the shaft 20, see Figure 5, and thereby the disc 21, so that the shoe 22 carried by said disc will actuate the slotted link 24, and through the link 27, cause the forward movement of the push bar 28. This push bar is guided in any suitable manner on the table, and, as the lowermost slat 4 of the stack is in the path of this push bar 28, the push bar moves the lowermost slat forwardly beneath the grid 29 but does not align it beneath the slots 30 in the grid 29, so that its grooves do not register with the slots in the grid. The lowermost leads in the slots of the grid rest on the top surface of the slat between the grooves.

As a slat is fed from beneath the stack beneath the grid, its forward portions engage one of the stops and the aligning rod 36. The next step in the operation is to align the grooved slats so that its grooves will register with the slots in the grid, and this is accomplished by the aligning member 41.

At the proper time, the cam 47 on the main driving shaft 12, actuating the roller 46, actuates a lever 43 and causes the aligning member 41 to press the slat against the stationary guides formed by a wall of the grid. The slots in the grid are now in alignment with the grooves so that the leads which have been resting on the top surface between the grooves roll into the grooves.

In order to supply the leads to the slots of the grid, I provide a supply of the leads in the hopper and effect relative movement of the hopper and the grid. As illustrated, the grid is stationary and the hopper reciprocates.

The main driving shaft 12 actuates the gear 61, which, in turn, drives the gear 59 thereby actuating the lever 55 and the link 57 to cause the lever 55 or link 54 to move the hopper 49 at the proper time forwardly and rearwardly. The slat beneath the grid which has been filled with leads is now out of alignment with the lowermost slat in the stack, so that, when the next slat is advanced, its grooves will be out of alignment with the grooves of the slat in which the lead has been laid, so that, as the incoming slat advances, the slat in which the lead has been laid will have its leads retained in their proper position and they can not work back into the grooves of the slat which is advancing the filled slat.

The lead carrying slat is moved forwardly until it comes into contact with the feed roller 71 which is intermittently actuated by the pawl and ratchet connection, already explained, so that, when the slat is advanced to bring its forward end in contact with the aligning member 83, all the leads are properly aligned in their grooves.

The next step in the operation is the feeding of the lead containing slats along the conveyor table 84 which leads to any desired point of utilization, such as, for example, the glueing mechanism.

The main driving shaft 12 actuates the disc 85, and thereby the link 87, rock arm 88, rock shaft 89, arm 90, and the push bar 92, which effects the feed of the lead filled slat along the conveyor table 84.

The machine can be adjusted as is apparent to receive slats having any desired number of grooves, and the leads may be prevented from entering a desired number of the grooves by means of rods 39 which enter the apertures 40 in the grid to prevent leads passing through predetermined slots 30 in the grid 29, so that the machine can be employed with slats containing a plurality of grooves. As a lead containing slat passes from beneath the grid, the resilient stop members, not only prevent more than one lead remaining in a groove but they also serve as resilient stop members to prevent the jamming and breaking of the leads in the hopper.

The reciprocation of the hopper tends to slightly agitate the leads so that they will roll into the slots in the grid. The bottom of the hopper is open and unobstructed so that the leads pass to the slots, and the leads pass into the slots by a rolling action, and they also pass from the slots into the grooves of the slats by rolling action, which tends to eliminate the breaking of the leads. The slots in the grid may be of any desired width.

In so far as I am aware, I am the first in the art to devise a lead laying machine wherein a lead filled slat is out of alignment with the next slat which is being fed or wherein a stationary slotted grid with a reciprocating hopper are employed and it is to be understood that I desire my claims to such features to receive the broad and generic interpretation to which a pioneer in the art is entitled.

It will be apparent that the various operations are automatic, and that all that the operator has to do is to maintain the supply of leads in the hopper and to maintain the supply of slats in the stack.

It will now be apparent that I have devised a new and useful lead laying machine for pencils which embodies the features of advantage enumerated as desirable in the statement of the invention and the above description, and that while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

I claim :—

1. In a lead laying machine slats having a plurality of grooves, and lead laying mechanism effective to simultaneously lay head in said grooves by a rolling action.

2. In a lead laying machine, a slotted grid, a lead receiving hopper above said grid, means to effect relative movement of said grid and hopper, and means to feed slats into their lead receiving position.

3. In a lead laying machine, a stationary slotted grid, a lead receiving hopper having an open bottom, means to reciprocate said hopper, and means to feed slats into and from their lead receiving position.

4. In a lead laying machine, slat feeding means to feed the slats into proximity to their lead receiving position, means to move a fed slat into its aligned lead receiving position and out of alignment with a slat being fed, and means to lay lead in a slat, and a lead containing slat being moved from its lead receiving position by the next slat into which the lead is to be laid.

5. In a lead laying machine, means to progressively feed slats into approximate lead receiving position, means to align a slat in lead receiving position, means to lay leads in the slats, and means to discharge the lead carrying slats from the machine.

6. In a lead laying machine, means to progressively feed slats into approximate lead receiving position, means to align a slat in lead receiving position, means to lay leads in the slats, a lead aligning member, and means to feed the lead containing slats into co-operation with said member.

7. In a lead laying machine, a slotted grid, means to prevent the leads passing through predetermined slots, a lead receiving hopper above said grid, means to effect relative movement of said grid and hopper, and means to feed slats into their lead receiving position.

8. In a lead laying machine, a bed, slat retaining means on the bed in which the slats are superimposed, a push bar to advance the lowermost slat into approximate lead receiving position, means to align a slat in its lead receiving position, means to lay leads on the slats, actuating means for said push bar, and means to discharge the filled slats.

9. In a lead laying machine, means to align a stack of grooved slats, means to progressively feed the lowermost slat of the stack into approximate lead receiving position, a slotted grid, means to move a fed slat to bring its grooves into registry with said slots, a reciprocatory lead containing hopper above said grid, and means to actuate said hopper, and a lead carrying slat being discharged from its lead receiving position by a slat being fed.

10. In a lead laying machine, means to align a stack of grooved slats, means to progressively feed the lowermost slat of the stack into approximate lead receiving position, a slotted grid, means to move a fed slat to bring its grooves into registry with said slots, a reciprocatory lead containing hopper above said grid, and means to actuate said hopper, a lead carrying slat being discharged from its lead receiving position by a slat being fed with the grooves of the slats out of register.

11. In a lead laying machine, a slotted guide, means to roll leads into said slots, and means to feed slats to bring their grooves into registry with said slots to cause leads from the slots to roll into said grooves.

12. In a lead laying machine, a support for a stack of slats, a stationary slotted grid, means to progressively move the lowermost slat of the stack beneath said grid with its grooves out of register with said slots, means to effect registration of said slots and grooves, a lead receiving hopper above said grid having an open bottom, means to reciprocate said hopper, a slat being discharged from lead receiving position by a slat being fed, and resilient stop members to prevent more than one lead in a slat groove being discharged with a lead carrying slat.

13. In a lead laying machine, a support for a stack of slats, a stationary slotted grid, means to progressively move the lowermost slat of the stack beneath said grid with its grooves out of register with said slots, means to effect registration of said slots and grooves, a lead receiving hopper above said grid having an open bottom, means to reciprocate said hopper, a slat being discharged from lead receiving position by a slat being fed, resilient stop members to prevent more than one lead in a slat groove being discharged with a lead carrying slat, and a slat feeding member to which a lead carrying slat is discharged.

14. In a lead laying machine, a support for a stack of slats, a stationary slotted grid, means to progressively move the lowermost slat of the stack beneath said grid with its grooves out of register with said slots, means to effect registration of said slots and grooves, a lead receiving hopper above said grid having an open bottom, means to reciprocate said hopper, a slat being discharged from lead receiving position by a slat being fed, resilient stop members to prevent more than one lead in a slat groove being discharged with a lead carrying slat, a slat feeding member to which a lead carrying slat is discharged and a lead aligning member to which a slat is fed by said slat feeding member.

15. In a lead laying machine, a support for a stack of slats, a stationary slotted grid, means to progressively move the lowermost slat of the stack beneath said grid with its grooves out of register with said slots, means to effect registration of said slots and grooves, a lead receiving hopper above said grid having an open bottom, means to reciprocate said hopper, a slat being discharged from lead receiving position by a slat being fed, resilient stop members to prevent more than one lead in a slat groove being discharged with a lead carrying slat, a slat feeding member to which a lead carrying slat is discharged, a lead aligning member to which a slat is fed by said slat feeding member and means to discharge the slats in which the leads have been aligned to a desired point of utilization.

16. In a lead laying machine, a bed, a slotted grid spaced from said bed, slat guiding members on said bed, means to feed slats beneath said grid, means to align a slat beneath said grid to bring its grooves into registry with said slots, a lead receiving reciprocatory hopper above said grid, a slat being fed causing a lead containing slat to be discharged from beneath said grid, and means carried by said hopper to prevent more than one lead for a groove to be discharged with a slat.

17. In a lead laying machine, a bed, a slotted grid spaced from said bed, slat guiding members on said bed, means to feed slats beneath said grid, means to align a slat beneath said grid to bring its grooves into registry with said slots and out of registry with the grooves of the next slat to be fed, a lead receiving reciprocatory hopper above said grid, a slat being fed causing a lead containing slat to be discharged from beneath said grid, and means carried by said hopper to prevent more than one lead for a groove to be discharged with a slat.

18. In a lead laying machine, a stack holder for the grooved slats, a slotted grid, means to progressively feed slats from the stack beneath said grid, means to position a slat beneath said grid to bring its grooves into registry with said slots and out of registry with the grooves of the next slat to be fed so that its front wall will contact with the rear ends of the leads of a lead containing slat, and means to feed leads to the slots of said grid.

JOHN S. FURST.